United States Patent
Lee et al.

(10) Patent No.: US 12,384,276 B2
(45) Date of Patent: Aug. 12, 2025

(54) ELECTRIFIED VEHICLE AND METHOD OF POWER SOURCE CONTROL FOR THE SAME

(71) Applicants: Hyundai Motor Company, Seoul (KR); Kia Corporation, Seoul (KR)

(72) Inventors: Won Jae Lee, Suwon-si (KR); Gi Young Kwon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 258 days.

(21) Appl. No.: 18/098,891

(22) Filed: Jan. 19, 2023

(65) Prior Publication Data

US 2024/0100993 A1    Mar. 28, 2024

(30) Foreign Application Priority Data

Sep. 28, 2022  (KR) .......................... 10-2022-0123510

(51) Int. Cl.
*B60L 58/18* (2019.01)
*B60L 3/00* (2019.01)

(52) U.S. Cl.
CPC .............. *B60L 58/18* (2019.02); *B60L 3/0046* (2013.01); *B60L 2260/52* (2013.01); *B60Y 2200/91* (2013.01)

(58) Field of Classification Search
None
See application file for complete search history.

(56) References Cited

U.S. PATENT DOCUMENTS

| 2017/0043671 | A1* | 2/2017 | Campbell | ............ G08G 1/0129 |
| 2017/0253138 | A1* | 9/2017 | Ger | .......................... B60L 50/66 |
| 2020/0164762 | A1* | 5/2020 | Vidhya | ..................... B60S 5/06 |

FOREIGN PATENT DOCUMENTS

KR    10-2022-0016693 A    2/2022

* cited by examiner

*Primary Examiner* — Jared Fureman
*Assistant Examiner* — Joel Barnett
(74) *Attorney, Agent, or Firm* — Morgan, Lewis & Bockius LLP (57) ABSTRACT

A method of power source control for the electrified vehicle includes: learning travel data in consideration of whether or not a swap battery is mounted in a vehicle in which a main battery is mounted at all times; determining a travel distance according to a currently mounted battery based on the travel data and a current driving point of the vehicle; and outputting information on swap or detachment of the swap battery based on the determined travel distance when the swap battery is mounted.

20 Claims, 4 Drawing Sheets

ELECTRIFIED VEHICLE AND METHOD OF POWER SOURCE CONTROL FOR THE SAME

CROSS REFERENCE TO RELATED APPLICATION

The present application claims priority to Korean Patent Application No. 10-2022-0123510, filed on Sep. 28, 2022, the entire contents of which is incorporated herein for all purposes by this reference.

BACKGROUND OF THE PRESENT DISCLOSURE

Field of the Present Disclosure

The present disclosure relates to an electrified vehicle configured for increasing usability of a swap battery by notifying a driver of a swap or detachment timing of the swap battery in consideration of whether or not the swap battery is mounted in a structure in which a main battery is always mounted, and a method for power source control for the same.

Description of Related Art

With the recent increase in interest in an environment, electrified vehicles having an electric motor as a power source tend to increase.

Even though a significant number of users of electrified vehicles have a short-distance travel pattern mainly in the center of a city, a charging time of a battery in the electrified vehicle is relatively longer than a refueling time of an internal combustion engine vehicle, and thus, a maximum electric vehicle (EV) travel distance by which the electrified vehicle may be driven by one-time full charge of the battery is important.

However, when a battery capacity is increased to increase the EV travel distance, a weight of the electrified vehicle is increased, and a price of the electrified vehicle significantly rises because a price of the battery accounts for a large portion of the price of the electrified vehicle. Furthermore, there is a problem that it takes a long time to fully charge the battery due to the increased capacity of the battery.

To solve problems such as a decrease in travel distance and a long charging time due to deterioration of the battery, some manufacturers consider a method of making the battery detachable to swap the battery In a case of a small mobility such as an electric scooter, a low-voltage/low-capacity battery may be applied to the small mobility so that a user may directly exchange the low-voltage/low-capacity battery, but it is difficult for the user himself or herself to swap a large-capacity battery for a vehicle due to weight and safety issues so that a dedicated infrastructure is required. However, it is necessary to secure a site and a swap equipment at a high cost to expand the infrastructure for battery swap, and even though the infrastructure is expanded, when there is physical damage to or electrical burnout of a fastening part at the time of accumulation of the number of times the battery has been swapped, there is also a problem that travel itself of the vehicle becomes difficult.

Furthermore, even though it is assumed that a detachable battery has a smaller capacity than a main battery, a weight of the detachable battery may have a large influence on fuel efficiency. However, there is also a problem that it is difficult for a driver to recognize an influence of whether or not the detachable battery is mounted on fuel efficiency so that whether or not the detachable battery has been mounted cannot but depend only on a state of charge.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electrified vehicle configured for increasing usability of a swap battery by notifying a driver of a swap or detachment timing of the swap battery in consideration of whether or not the swap battery is mounted in a structure in which a main battery is always mounted, and a method for power source control for the same.

Objects of the present disclosure are not limited to the above-described objects, and other objects that are not mentioned may be obviously understood by those having ordinary skill in the art to which the present disclosure pertains from the following description.

According to an exemplary embodiment of the present disclosure, a method of power source control for an electrified vehicle includes: learning travel data in consideration of whether or not a swap battery is mounted in a vehicle in which a main battery is mounted at all times; determining a travel distance according to a currently mounted battery based on the travel data and a current driving point of the vehicle; and outputting information on swap or detachment of the swap battery based on the determined travel distance when the swap battery is mounted.

The learning of the travel data may include learning a plurality of pieces of travel data according to whether the swap battery is mounted.

The plurality of pieces of travel data may include first, second, and third travel data according to whether the swap battery is mounted.

The learning of the travel data may include learning actually consumed energy according to the travel distance as the first travel data when the swap battery is not mounted.

The learning of the travel data may include learning actually consumed energy according to the travel distance as the second travel data when the swap battery is mounted.

The learning of the travel data may include learning expected consumed energy according to a travel distance as third travel data on assumption that which the swap battery is detached when the swap battery is mounted.

The third travel data may include a first expected value which is expected consumed energy according to the travel distance determined by learning through a learning model in which a traveling environment is reflected and a second expected value determined by learning through a learning model in which a correction value is applied to the second travel data.

The determining of the travel distance may include outputting travel data having consumed energy similar to the current driving point of the vehicle in each of the first, second and third travel data and determining first, second and third driving distances each corresponding to the first, second and third travel data based on each of the output travel data and a current energy of the currently mounted battery.

The determining of the first, second and third travel distances may further include determining a fourth travel distance based on the first travel distance and the third travel distance.

The determining of the fourth travel distance may include determining the fourth travel distance by reflecting a weight on each of the determined first travel distance and third travel distance.

The outputting of the information may include comparing the determined second travel distance and fourth travel distance with each other and outputting the information on the swap or the detachment of the swap battery when the second travel distance is smaller than the fourth travel distance.

The outputting of the information may further include outputting the first travel distance when the swap battery is not mounted.

According to another exemplary embodiment of the present disclosure, an electrified vehicle includes: a main battery and a swap battery; a travel distance control unit configured for learning travel data in which it is considered whether or not the swap battery is mounted in a vehicle in which the main battery is mounted at all times and determining a travel distance according to a currently mounted battery based on the travel data and a current driving point of the vehicle; and an output device configured for outputting information on swap or detachment of the swap battery based on the determined travel distance when the swap battery is mounted.

The travel distance control unit may learn a plurality of pieces of travel data according to whether the swap battery is mounted.

The travel distance control unit may learn actually consumed energy according to a travel distance as first travel data when the swap battery is not mounted.

The travel distance control unit may learn actually consumed energy according to a travel distance as second travel data when the swap battery is mounted.

The travel distance control unit may learn expected consumed energy according to a travel distance as third travel data on assumption that which the swap battery is detached when the swap battery is mounted.

The travel distance control unit may output travel data having consumed energy similar to the current driving point of the vehicle in each of the first, second and third travel data, and determine first, second and third driving distances each corresponding to the first, second and third travel data based on each of the output travel data and a current energy of the currently mounted battery.

The travel distance control unit may determine a fourth travel distance by reflecting a weight on each of the determined first travel distance and third travel distance.

The output device may compare the determined second travel distance and fourth travel distance with each other and output the information on the swap or the detachment of the swap battery when the second travel distance is smaller than the fourth travel distance.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

When it is decided that a detailed description of a related known art may obscure the gist of the present disclosure in describing embodiments included in an exemplary embodiment of the present disclosure, the detailed description will be omitted. Furthermore, it is to be understood that the accompanying drawings are provided only for easy understanding of embodiments of the present disclosure, and the spirit of the present disclosure is not limited by the accompanying drawings, but includes all the modifications, equivalents, and substitutions included in the spirit and the scope of the present disclosure.

The terms including ordinal numbers such as "first" and "second" may be used to describe various components, but these components are not limited by these terms. These terms are used only to distinguish one component from another component.

It is to be understood that when one component is referred to as being "connected to" or "coupled to" another component, one component may be directly connected to or directly coupled to another component or be connected to or coupled to another component with the other component interposed therebetween. On the other hand, it is to be understood that when one component is referred to as being "directly connected to" or "directly coupled to" another component, it may be connected to or coupled to another component without the other component interposed therebetween.

Singular forms include plural forms unless the context clearly indicates otherwise.

It is to be understood that the terms "include" or "have" as used herein specify the presence of features, numerals, steps, operations, components, parts mentioned in an exemplary embodiment of the present disclosure, or combinations thereof, and do not preclude the presence or addition of one or more other features, numerals, steps, operations, components, parts, or combinations thereof.

Hereinafter, various embodiments of the present disclosure will be described in detail with reference to the accompanying drawings, but the same or similar components will be denoted by the same reference numerals independent of the drawing numerals, and an overlapping description of the same or similar components will be omitted.

Furthermore, a unit or a control unit included in terms such as a hybrid control unit (HCU) and a vehicle control unit (VCU) is only a term widely used to name a controller that is configured to control a specific function of a vehicle, and does not refer to a generic function unit. For example, each control unit may include a communication device that communicates with other control units or sensors to control assigned functions, a memory that stores an operating system or a logic command, input/output information, and the like, and one or more processors that perform decision, calculation, determination, and the like, required for controlling the assigned functions.

First, a configuration of an electrified vehicle according to an exemplary embodiment will be described with reference to FIG. 1.

Figure 1:
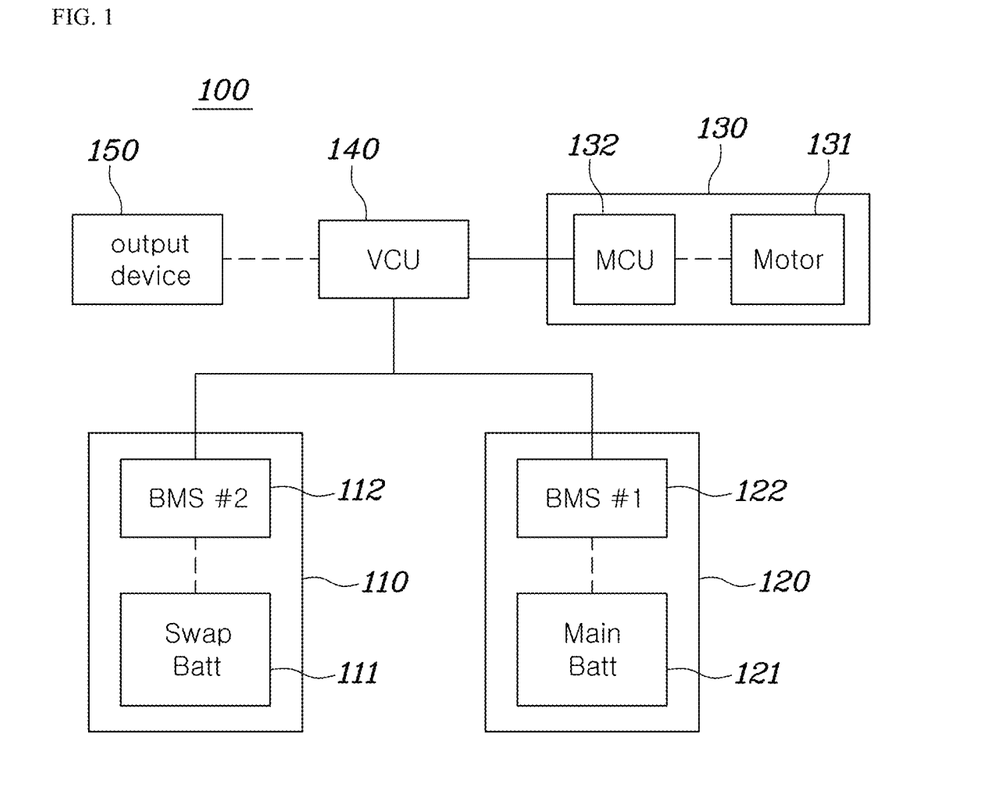
FIG. 1 is a block diagram of an electrified vehicle mounted with a detachable swap battery according to an exemplary embodiment of the present disclosure.

FIG. 1 is a block diagram of an electrified vehicle mounted with a detachable swap battery according to an exemplary embodiment of the present disclosure.

Referring to FIG. 1, an electrified vehicle 100 according to various exemplary embodiments of the present disclosure may include a swap battery unit 110, a main battery unit 120, a power electric (PE) 130, a vehicle control unit 140, and an output device 150. FIG. 1 mainly illustrates components related to the exemplary embodiment, and the electrified vehicle 100 may include components fewer or more than the components illustrated in FIG. 1 when it is actually implemented.

Hereinafter, respective components will be described.

The swap battery unit 110 may include a swap battery 111 and a second battery management system (BMS) 112. The second battery management system 112 may control a voltage, a current, a temperature, a state of charge (SOC), a state of health (SOH), and the like, of the swap battery 111, and control charging/discharging of the swap battery 111. Furthermore, the second battery management system 112 may set and control an upper limit and a lower limit for the SOC value of the swap battery 111, and may store cell type information, rated capacity information, and the like, of the swap battery 111. Furthermore, the second battery management system 112 may transmit information on swap battery 111 to the outside and receive a command for charging/discharging of the swap battery 111, through a predetermined vehicle communication protocol (e.g., a controller area network (CAN)).

Although not illustrated in FIG. 1, the swap battery unit 110 may be provided with a cooling device configured for cooling the swap battery 111, for example, an air cooling fan. In the instant case, the second battery management system 112 may control an operating state of the air cooling fan according to a state of the swap battery 111, a vehicle speed, or the like. The swap battery unit 110 may be implemented in a natural cooling manner or may be cooled in a water cooling manner by disposing a cooling pad through which a coolant is circulated in a portion of the vehicle in which the swap battery unit 110 is mounted.

Meanwhile, the swap battery unit 110 may be mounted on a roof of the electrified vehicle 100, be accommodated in a space in a trunk or a lower space of the vehicle, or be connected to the vehicle in a form of a trailer by including a separate wheel, but this is only an example and the present disclosure is not necessarily limited thereto.

The main battery unit 120 may include a main battery 121 and a first battery management system 122 as illustrated in FIG. 1, and the main battery unit 120 is fixedly mounted in the vehicle at all times. The first battery management system 122 may control a voltage, a current, a temperature, a state of charge (SOC), a state of health (SOH), and the like, of the main battery 121, and control charging/discharging of the main battery 121.

The power electric 130 may include a motor 131 and a motor control unit (MCU) 132 controlling the motor 131.

The vehicle control unit 140 may decide a required driving force according to an accelerator pedal position sensor (APS) value of an APS, and decide a required braking force according to a brake pedal position sensor (BPS) value of a BPS. The vehicle control unit 140 may determine a driving torque or a regenerative braking torque to be output by the motor 131 of the power electric 130 according to the required driving force or the required braking force, and transfer a torque command according to the determined torque to the motor control unit 132 or an inverter. Furthermore, the vehicle control unit 140 may transfer a charge or discharge command for the main battery 121 or the swap battery 111 to a corresponding battery management system of the first battery management system 122 and the second battery management system 112 according to a travel situation and states of the main battery 121, the swap battery 111, and the like.

An object of the present disclosure is to notify a driver of a swap or detachment timing of the swap battery 111 by performing power source control of the electrified vehicle to be described later. Therefore, the electrified vehicle according to an exemplary embodiment of the present disclosure may further include the output device 150 outputting information on swap or detachment of the swap battery 111. The information on the swap or the detachment of the swap battery 111 may be transferred to the driver in a form of a voice, an image, or a text through the output device 150. For example, the output device 150 may include a display device configured for visually outputting the form of an image or a text, a speaker configured for outputting a voice, and the like. The display device may be implemented as a display or the like of a cluster or an audio/video/navigation (AVN) system. However, this is only an example, and various methods of transferring the information to the driver through the output device 150 other than the methods described above may be applied.

Figure 2:
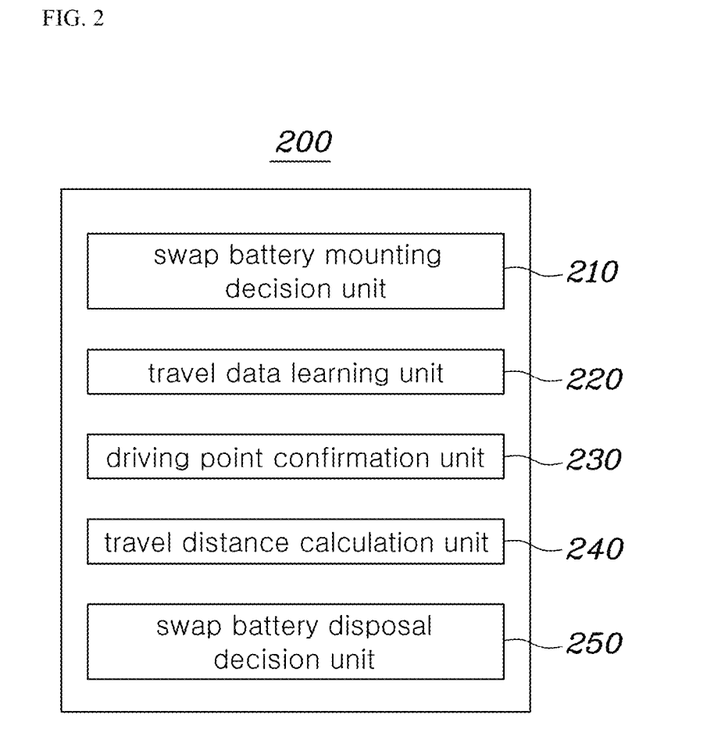
FIG. 2 is a block diagram of a travel distance control unit performing power source control of the electrified vehicle according to an exemplary embodiment of the present disclosure.

Meanwhile, FIG. 2 is a block diagram of a travel distance control unit performing power source control of the electrified vehicle according to an exemplary embodiment of the present disclosure. In an exemplary embodiment of the present disclosure, the electrified vehicle 100 may further include a travel distance control unit 200 learning travel data of the vehicle, determining a travel distance based on the learned travel data and a current driving point of the vehicle, and notifying the driver of a swap or detachment timing of the swap battery 111 based on the determined travel length. Furthermore, the travel distance control unit 200 may include a swap battery mounting decision unit 210, a travel data learning unit 220, a driving point confirmation unit 230, a travel distance determination unit 240, and a swap battery disposal decision unit 250.

The swap battery mounting decision unit 210 may confirm whether or not the swap battery 111 is mounted. For example, the swap battery mounting decision unit 210 may confirm whether or not the swap battery 111 is mounted, and provide a confirmed result. Furthermore, the travel data learning unit 220 may learn travel data obtained while the vehicle is traveling. As an exemplary embodiment of the present disclosure, the travel data may include consumed energy information for each path obtained while the vehicle is traveling, consumed energy information through an electric load such as air conditioning, and the like. Furthermore, the travel data learning unit 220 may learn consumed energy information due to a trailer mounting load as travel data, for example, when the trailer is connected to the vehicle.

Furthermore, the driving point confirmation unit 230 may confirm a current driving point while the vehicle is traveling. As an exemplary embodiment of the present disclosure, the driving point confirmation unit 230 may obtain information on a torque and revolutions per minute (RPM) for each driving source. For example, in a case of the vehicle including the configuration as illustrated in FIG. 1, the driving point confirmation unit 230 may obtain information on a driving point of the motor 131 from the vehicle control unit 140 or the motor control unit 132. However, this is only an example, and there may various methods of confirming the driving point of the vehicle.

Furthermore, the travel distance determination unit 240 may determine a travelable distance of the vehicle based on the data obtained from the travel data learning unit 220. For example, the travel distance determination unit 240 may predict a current miles per gallon gasoline equivalent (MPGe) of the vehicle based on the data obtained from the travel data learning unit 220, and determine the travelable distance based on the predicted MPGe and energy currently stored in the battery. The driver may confirm a current remaining travel distance of the vehicle through the travelable distance determined by the travel distance determination unit 240.

Furthermore, the swap battery disposal decision unit 250 may decide whether or not swap or detachment of the swap battery 111 is necessary. Even though is a difference depending on a capacity or a configuration of the swap battery 111, a weight of the vehicle may increase to significantly affect an MPGe when the swap battery 111 is mounted. In the instant case, when the vehicle travels in a state in which the swap battery 111 is mounted in the vehicle even though a role of the swap battery 111 contributing to a remaining travel distance is small due to a low remaining state of charge of the swap battery 111, the MPGe is lowered, which causes a decrease in the remaining travel distance. Accordingly, it is possible to prevent loss of the travel length by decreasing a weight of the vehicle through detachment of the swap battery 111 at an appropriate timing, for example, when the remaining state of charge of the swap battery 111 is low. Alternatively, it is possible to increase the travel distance even though the weight of the vehicle increases through swap of the swap battery 111.

The travel distance control unit 200 may be implemented according to a type of vehicle. For example, the travel distance control unit 200 may be implemented as one function of a higher-level control unit controlling the entirety of a powertrain, such as the vehicle control unit 140 when the vehicle is an electric vehicle, a hybrid control unit (HCU) when the vehicle is a hybrid vehicle, or the like. However, this is only an example, and the present disclosure is not necessarily limited thereto. For example, the travel distance control unit 200 may be implemented as a control unit separate from the high-level control unit or may be implemented in a form in which its functions are distributed in two or more different control units.

Figure 3:
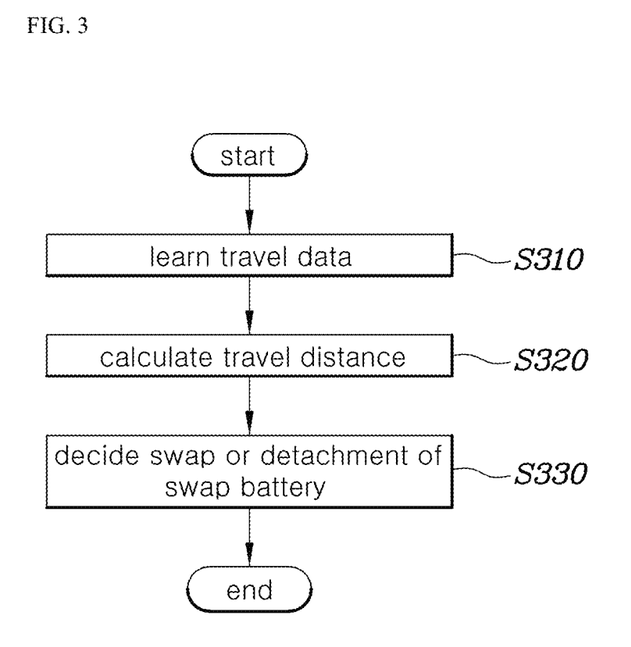
FIG. 3 is a schematic flowchart illustrating a method of power source control for an electrified vehicle according to an exemplary embodiment of the present disclosure.
Figure 4:
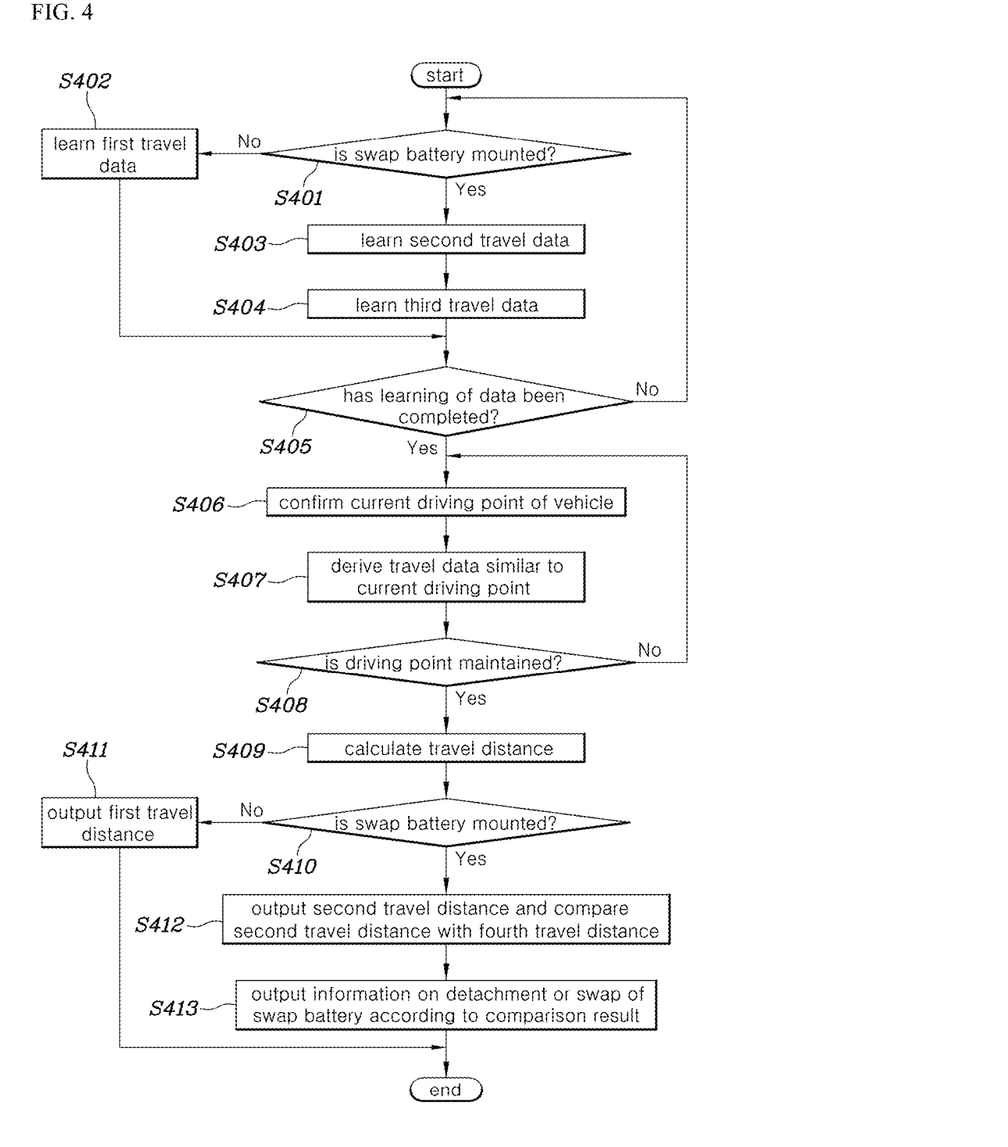
FIG. 4 is a detailed flowchart illustrating the method of power source control for an electrified vehicle according to an exemplary embodiment of the present disclosure.

Hereinafter, a method of power source control for an electrified vehicle 100 according to an exemplary embodiment will be described with reference to FIG. 3 and FIG. 4 based on the configuration of the electrified vehicle described above with reference to FIG. 1 and FIG. 2. In FIG. 3 and FIG. 4, for convenience of explanation, it is assumed that the travel distance control unit 200 is implemented as the vehicle control unit 140.

FIG. 3 is a schematic flowchart illustrating a method of power source control for an electrified vehicle according to an exemplary embodiment of the present disclosure.

As an exemplary embodiment of the present disclosure, a method of power source control for an electrified vehicle 100 may include: learning travel data in which it is considered whether or not the swap battery 111 is mounted in a vehicle in which the main battery 121 is mounted at all times (S310); determining a travel distance according to a currently mounted battery based on the travel data and a current driving point of the vehicle (S320); and outputting information on swap or detachment of the swap battery 111 based on the determined travel distance when the swap battery is mounted (S330).

In the method of power source control for an electrified vehicle 100 according to an exemplary embodiment of the present disclosure, the information on the swap or the detachment of the swap battery 111 may be output to increase the travel distance. A remaining travel distance of the vehicle needs to be decided to grasp a swap or detachment timing of the swap battery 111 and an MPGe corresponding to a current driving point needs to be decided to decide the travel distance. Accordingly, in an exemplary embodiment of the present disclosure, it is provided to use the travel data learned at the time of driving of the vehicle to decide the MPGe. As an exemplary embodiment of the present disclosure, the travel data in an exemplary embodiment of the present disclosure may be consumed energy according to the travel distance in which it is considered whether or not a battery is mounted, that is, an MPGe. This is only an example, and the travel data may be learned through various methods other than that described above. Hereinafter, a detailed method of power source control for an electrified vehicle 100 will be described with reference to FIG. 4.

FIG. 4 is a detailed flowchart illustrating the method of power source control for an electrified vehicle according to an exemplary embodiment of the present disclosure.

Referring to FIG. 4, first, the vehicle control unit 140 may confirm whether or not the swap battery 111 is mounted (S401). This is because the travel data obtained at the time of driving of the vehicle changes depending on whether or not the swap battery 111 is mounted. For example, when the swap battery 111 is not mounted (No in S401), the vehicle control unit 140 may learn actually consumed energy consumed in the vehicle according to the travel distance as first travel data (S402). The vehicle control unit 140 may learn actually consumed energy according to various travel distances by changing a travel distance, and learn the first travel data as a value obtained by adding values obtained by reflecting a weight to each actually consumed energy. As an exemplary embodiment of the present disclosure, the vehicle control unit 140 may determine actually consumed energy for each 50 km of a travel distance and determine actually consumed energy for each 2 km of a travel distance. Furthermore, the vehicle control unit 140 may determine the first travel data by multiplying the actually consumed energy for each 50 km and the actually consumed energy for each 2 km by a weight a (0≤a≤1).

First Travel Data=(Actually Consumed Energy for Each 50 km)×a+(Actually Consumed Energy for Each 2 km)×(1−a)  [Equation 1]

In Equation 1, it may be seen that the greater the weight a, the greater the proportion of consumed energy according to long-term travel data (50 km) in the first travel data, while the smaller the weight a, the greater the proportion of consumed energy according to short-term travel data (2 km) in the first travel data.

As an exemplary embodiment of the present disclosure, the first travel data may be determined as represented in Equation 1, and the vehicle control unit 140 learns the determined first travel data. A process of determining the first travel data is only an example, and the first travel data may be determined by applying various methods other than the method described above.

On the other hand, when the swap battery 111 is mounted (Yes in S401), the vehicle control unit 140 may learn actually consumed energy according to a travel distance as second travel data (S403). When the swap battery 111 is mounted, the vehicle travels using the main battery 121 and the swap battery 111 together, but the vehicle will show a different MPGe because the swap battery 111 is further included in a vehicle weight as compared with a case of learning the first travel data when a similar travel environment is assumed. Accordingly, when the swap battery 111 is mounted, the vehicle control unit 140 needs to learn the actually consumed energy according to the travel distance as the second travel data. Furthermore, in the instant case, the vehicle control unit 140 may determine the second travel data by applying a predetermined weight, similar to a case of determining the first travel data.

Furthermore, the vehicle control unit 140 may learn expected consumed energy of the main battery 121 according to the travel distance as third travel data on the assumption that which the swap battery 111 is detached when the swap battery 111 is mounted (S404). The third travel data may be determined based on a first expected value and a second expected value. The first expected value may be expected consumed energy according to the travel distance in which whether or not the driver accelerates the vehicle, a vehicle speed, a gradient of a road surface, or the like, is considered in a state in which it is assumed that the swap battery 111 is detached. The second expected value may be data learned through a learning model in which a correction value assuming detachment of the swap battery 111 is applied to the second travel data.

The third travel data may be determined by reflecting a weight a (0≤a≤1) to each of the first expected value and the second expected value, similar to the first travel data and the second travel data. However, in the instant case, the weight a may vary depending on accuracy of the first expected value and the second expected value, and may have a value different from the weight applied to the first and second travel data.

Meanwhile, the learned first travel data, second travel data, and third travel data may be stored in the vehicle control unit 140 for each driving point of a driving source at the time of learning. This is because the MPGe shows a large difference depending on the driving point of the driving source as well as whether or not the swap battery 111 is mounted. As an exemplary embodiment of the present disclosure, the vehicle control unit 140 may include a data map, and the learned first travel data, second travel data, and third travel data may be stored in the data map. In the instant case, each travel data may be classified for each driving point at the time of learning.

Accordingly, the vehicle control unit 140 may decide whether or not learning of all travel data has been completed (S405). This is because the need for swap or detachment of the swap battery 111 may be decided based on the travel data learned by the vehicle control unit 140 only when the learning of the travel data is completed. Accordingly, when the learning of the data is completed (Yes in S405), the vehicle control unit 140 may confirm a current driving point of the vehicle (S406).

The vehicle control unit 140 may confirm the current driving point of the vehicle, and may derive travel data including an energy consumption amount for each travel distance most similar to an energy consumption amount for each travel distance according to the current driving point (or including a similar driving point at the time of learning) for each of the first, second and third travel data (S407).

When the driving point is changed (No in S408), travel data corresponding to the changed driving point may be decided again. This is to improve control accuracy because the derived travel data may be used if the driving point of the vehicle is maintained, but the derived travel data may be data that is not similar to the current driving point if the driving point of the vehicle is not maintained and changed.

The vehicle control unit 140 may determine a travel distance according to each derived travel data (S409). In more detail, the vehicle control unit 140 may determine first to third travel distances each corresponding to the derived first, second and third travel data using the derived first to third travel data. For example, because the first travel data refers to an MPGe in a situation in which the swap battery 111 is not mounted, the first driver distance, which is a remaining travel distance expected when only the main battery 121 is used in a situation in which the swap battery 111 is detached, may be determined by dividing energy stored in the main battery 121 by the first travel data.

Furthermore, the vehicle control unit 140 may determine the second travel distance by dividing the total stored energy of the main battery 121 and the swap battery 111 by the derived second travel data. Here, because the second travel data is an MPGe learned when the swap battery 111 is mounted, the second travel distance may refer to a remaining travel distance expected when energy of the main battery 121 and energy of the swap battery 111 are used together in a situation in which the swap battery 111 is mounted.

Furthermore, the vehicle control unit 140 may determine the third travel distance by dividing the energy stored in the main battery 121 by the derived third travel data. Here, because the third travel data is an MPGe learned through model learning assuming detachment of the swap battery 111, the third travel distance may refer to a remaining travel distance expected in a situation in which the swap battery 111 is removed.

Accordingly, the vehicle control unit 140 may determine a fourth travel distance by reflecting a weight a (0≤a≤1), to each of the first travel distance and the third travel distance. For example, the fourth travel distance may be determined as represented in Equation 2.

Fourth Travel Distance=(First Travel Distance)×a+ (Third Travel Distance)×(1−a)  [Equation 2]

In the instant case, the weight a may vary depending on a degree of coincidence of the current driving point of the vehicle or accuracy of the third travel data required for determining the third travel distance.

Accordingly, when the swap battery 111 is not mounted (No in S410), the vehicle control unit 140 may output the determined first travel distance (S411). By outputting the first travel distance, it is possible to allow the driver to confirm a travelable distance of the vehicle at the current driving point.

On the other hand, when the swap battery 111 is mounted (Yes in S410), the vehicle control unit 140 may output the determined second travel distance (S412). In the instant case, the vehicle control unit 140 may compare the second travel distance with the fourth travel distance. This is because it means that a travel distance becomes longer when the swap battery 111 is removed if the fourth travel distance is greater than the second travel distance.

When the second travel distance is smaller than the fourth travel distance, the vehicle control unit 140 may control the output device 150 to output information indicating that the swap battery 111 needs to be detached or swapped (S413).

Accordingly, the driver may detach or swap the swap battery 111 based on the information on the detachment or the swap of the swap battery 111 output through the output device 150, and accordingly, may prevent loss of the travel distance when the electrified vehicle 100 travels.

According to the electrified vehicle and the method of power source control for the same according to an exemplary embodiment of the present disclosure, by confirming the swap or detachment timing of the swap battery and notifying the driver of the swap or detachment timing of the swap battery, it is possible to efficiently use an electrified vehicle system mounted with the swap battery.

By learning the travel data of the vehicle, determining the travel distance according to whether or not the swap battery is mounted based on the learned travel data to confirm the swap or detachment timing of the swap battery, and notifying the driver of the swap or detachment timing of the swap battery, it is possible to efficiently use the main battery and the swap battery to improve the travel distance of the vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of power source control for an electrified vehicle, the method comprising:
    learning, by a control unit, travel data in consideration of whether or not a swap battery is mounted in a vehicle in which a main battery is mounted at all times;
    determining, by the control unit, a travel distance according to a currently mounted battery based on the travel data and a current driving point of the vehicle; and
    outputting, by the control unit, information on swap or detachment of the swap battery based on the determined travel distance when the swap battery is mounted,
    wherein the outputting is performed by an output device which outputs the information in a form of a voice, an image or a text to transfer the information to a driver.

2. The method of claim 1, wherein the learning of the travel data includes learning a plurality of pieces of travel data according to whether the swap battery is mounted.

3. The method of claim 2, wherein the plurality of pieces of travel data include first, second and third travel data according to whether the swap battery is mounted.

4. The method of claim 3, wherein the learning of the travel data includes learning actually consumed energy according to the travel distance as the first travel data when the swap battery is not mounted.

5. The method of claim 3, wherein the learning of the travel data includes learning actually consumed energy according to the travel distance as the second travel data when the swap battery is mounted.

6. The method of claim 3, wherein the learning of the travel data includes learning expected consumed energy according to the travel distance as the third travel data on assumption that the swap battery is detached when the swap battery is mounted.

7. The method of claim 6, wherein the third travel data includes a first expected value which is expected consumed energy according to the travel distance determined by learning through a learning model in which a traveling environment is reflected and a second expected value determined by learning through a learning model in which a correction value is applied to the second travel data.

8. The method of claim 3, wherein the determining of the travel distance includes outputting travel data including consumed energy similar to the current driving point of the vehicle in each of the first, second and third travel data and determining first, second and third driving distances each corresponding to the first, second and third travel data based on each of the output travel data and a current energy of the currently mounted battery.

9. The method of claim 8, wherein the determining of the first, second and third travel distances further includes determining a fourth travel distance based on the first travel distance and the third travel distance.

10. The method of claim 9, wherein the determining of the fourth travel distance includes determining the fourth travel distance by reflecting a weight on each of the determined first travel distance and the determined third travel distance.

11. The method of claim 9, wherein the outputting of the information includes comparing the determined second travel distance and the determined fourth travel distance with each other and outputting the information on the swap or the detachment of the swap battery when the second travel distance is smaller than the fourth travel distance.

12. The method of claim 8, wherein the outputting of the information further includes outputting the first travel distance when the swap battery is not mounted.

13. An electrified vehicle comprising:
    a main battery and a swap battery;
    a travel distance control unit configured for learning travel data in consideration of whether or not the swap battery is mounted in a vehicle in which the main battery is mounted at all times and determining a travel distance according to a currently mounted battery based on the travel data and a current driving point of the vehicle; and
    an output device configured for outputting information on swap or detachment of the swap battery based on the determined travel distance when the swap battery is mounted,
    wherein the output device is configured to output the information in a form of a voice, an image or a text to transfer the information to a driver.

14. The electrified vehicle of claim 13, wherein the travel distance control unit is further configured to learn a plurality of pieces of travel data according to whether or not the swap battery is mounted.

15. The electrified vehicle of claim 14, wherein the travel distance control unit is further configured to learn actually consumed energy according to the travel distance as first travel data when the swap battery is not mounted.

16. The electrified vehicle of claim 15, wherein the travel distance control unit is further configured to learn actually consumed energy according to the travel distance as second travel data when the swap battery is mounted.

17. The electrified vehicle of claim 16, wherein the travel distance control unit is further configured to learn expected consumed energy according to the travel distance as third travel data on assumption that which the swap battery is detached when the swap battery is mounted.

18. The electrified vehicle of claim 17, wherein the travel distance control unit is further configured to output travel data including consumed energy similar to the current driving point of the vehicle in each of the first, second and third travel data, and determines first, second and third driving distances each corresponding to the first, second and third travel data based on each of the output travel data and a current energy of the currently mounted battery.

19. The electrified vehicle of claim 18, wherein the travel distance control unit is further configured to determine a fourth travel distance by reflecting a weight on each of the determined first travel distance and the determined third travel distance.

20. The electrified vehicle of claim 19, wherein the output device is further configured to compare the determined second travel distance and the determined fourth travel distance with each other and to output the information on the swap or the detachment of the swap battery when the second travel distance is smaller than the fourth travel distance.

* * * * *